Figure 1:
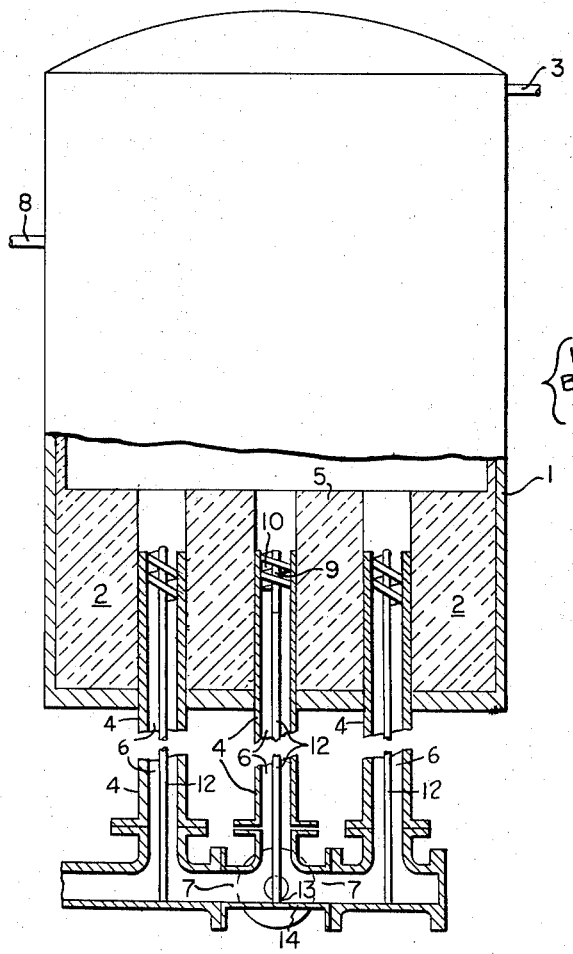

Oct. 14, 1958   W. E. DUNN, JR   2,856,264
CHARGING FLUIDIZING GAS INTO FLUIDIZED BED REACTOR
Filed April 9, 1954

INVENTOR
WENDELL E. DUNN, JR.
BY
ATTORNEY

United States Patent Office 2,856,264
Patented Oct. 14, 1958

2,856,264

CHARGING FLUIDIZING GAS INTO FLUIDIZED BED REACTOR

Wendell E. Dunn, Jr., Newark, Del., assignor to E. I. du Pont de Nemours and Company, Wilmington, Del., a corporation of Delaware Application April 9, 1954, Serial No. 422,162

4 Claims. (Cl. 23—87)

This invention relates to novel methods and means for charging a fluidizing medium into a fluidized bed reactor. More particularly, it relates to an improved apparatus for effecting and insuring an evenly distributed flow of a fluidizing vapor into said reactor during its operational periods while preventing back-flow of solids at cessation of the fluidization, and which will allow unimpeded start-up on resumption of the fluidizing operation.

Fluidized solids processes such as those employed for chlorinating a titaniferous material in the presence of a carbonaceous reducing agent are most efficient when the entering gases are uniformly distributed over the entire cross-section of the chamber containing the solids being fluidized, so that maximum contact between gases and solids particles is assured. One most commonly used type of apparatus in large-scale operations comprises that containing a perforated plate or grate type bottom, with the grate serving as a distributor for the vapor charged. However, it is very difficult to construct this plate type of distributor of any material except metal, and if corrosive chemicals are present and elevated temperatures exist in the operation, no suitable metals are available for desired, prolonged satisfactory use. Resort to porous refractory plates can be made in some instances but are subject to disadvantageous, troublesome plugging. Furthermore, with grates having relatively large openings, portions of solid material tend to accumulate in certain areas of the plates to induce excessive flow in the remaining openings. Alleviation of this condition entails a costly and time-consuming operation. Recourse to other types of apparatus for introducing a fluidizing gas into a chemical reactor of this type has also proved to be unsatisfactory. Due to the relatively high temperatures of the reaction (850–1300° C.) and the corrosive nature of the reacting components, the bottom or floor portion of the reactor is usually quite thick and is made up of a refractory material. For this reason the gas entrance tubes are usually positioned vertically through the reactor floor. While good gas distribution can, at times, be obtained by positioning constricting orifices or the like below these vertical inlet tubes and outside the furnace or its lining, this is generally unsatisfactory because objectionable solids back-flow is encountered upon cessation of the normal upward flow of fluidizing gas. In consequence, objectionable plugging of these vertical tubes occurs and a costly shut-down and clean-out operation must be resorted to prior to resumption of the operation. This is particularly true in instances where the solids present become soft or sticky in nature. In an effort to overcome this, use of a short horizontal or nearly horizontal section of conduit, either within the chamber itself or somewhere closely adjacent to the surface of the floor to prevent the bed solids from falling back into the vertical entrance conduits, has been attempted. But such horizontal passages, when constructed of refractory material, are relatively fragile, readily break, and the section is very difficult to clean from without the reaction chamber, particularly where reaction product stickiness develops. Again, where fragile horizontal outlet tubes break and solids drop into the vertical entrance tube, particularly during non-operation periods, plugging and poor gas distribution results. It is then only a matter of time when very poor distribution of the fluidization vapor takes place and a complete loss of reaction efficiency results.

It is among the objects of this invention to overcome these and other disadvantages which characterize prior fluidized bed reaction methods and apparatus. It is among the particular objects to provide an improved apparatus for introducing a fluidizing vapor through a plurality of reactor inlets and for maintaining solids in fluidized suspension therein, having means for automatically regulating the inlet pressure so that gas flow through the individual multiple inlets from a common source of vapor supply remains at all times essentially constant and uniformly distributed and further means for preventing solids back-flow into the vertical conduits of the chamber and consequent plugging thereof upon cessation of the upward flow of the fluidizing vapor. A further object is to reduce the rate of fouling at the constricting orifice from vapor-borne dust and liquid mists in the fluidizing gas. A further object is to provide an easy and accurate positioning of said apparatus within the conduit. An additional object is to provide easy removal of the constricting throat components for inspection and cleaning without requiring access thereto from the interior of the reactor. A still further object is to provide novel means for effecting easy resumption of the upward flow of the fluidizing vapor through the reactor after the bed particles have settled down over the inlets following cessation of the fluidizing gas flow. Other objects and advantages of the invention will be evident from the ensuing description and from the accompanying drawings wherein Fig. 1 is a sectional, side elevational view of one form of apparatus in which the invention can be practiced; and Fig. 2 is a modified, preferred form of helix adapted for use in the invention.

Figure 2:
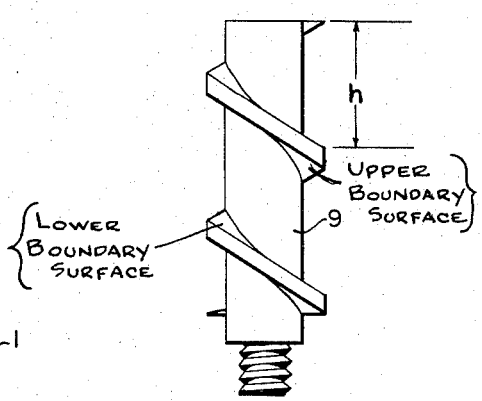
Figure 3:
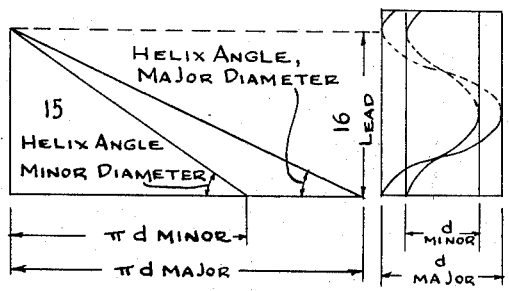

Fig. 3 is a development of the spiral insert of Fig. 2, showing the graphic triangle which results from the unwrapping of one turn of the helical surface.

These and other objects are accomplished in this invention which comprises charging a fluidizing reactant medium into a fluidized solids reactor through a vertical inlet conduit provided with a serpentine helical passage having a helix angle within its lower boundary surface which is less than the effective angle of slide of the solids in said reactor and a cross sectional area smaller than the area of said conduit.

In a more specific embodiment, the invention comprises introducing a fluidizing reactant gas, particularly chlorine, into a reactor adapted to be maintained at temperatures ranging from about 800–1050° C. containing fluidized, finely divided titaniferous ore and carbonaceous reducing agent solids for reaction, through a serpentine helical passage formed within a vertical bottom inlet to said reactor, maintaining the greatest helix angle within the lower boundary surface of said passage less than the effective angle of slide of said solids, the cross sectional area of the helix smaller than the area of said inlet, and said boundary surface of a length equivalent to at least $$\left[1 + \frac{h \cos A \cdot \sin B}{L \sin (A-B)}\right]$$

turns, wherein $h$ = the vertical height of the helical passage between a point on the radial line generating the upper boundary surface and a corresponding point directly below on the lower boundary surface B = the maximum helix angle at the lower boundary surface
A = the effective angle of repose of the solids
L = "Lead" of helical thread In description, reference will be made to the preparation of titanium tetrachloride in a continuous type fluidization operation in accordance with the invention. Such product can be obtained by chlorinating at elevated temperatures (600° C.–1150° C.) the titanium values of a titaniferous material (ilmenite or rutile ores, $TiO_2$ concentrates, etc.) in the presence of a solid or gaseous reducing agent, including carbon, charcoal, coke, coal, etc. Examples of prior methods therefor include U. S. Patents 1,179,394, 1,528,319, 1,878,013, 2,184,884, 2,184,885 and 2,184,887. In a fluid bed chlorination the reactor bed suspension of, say, finely divided ilmenite ore and granular coke, together with partially reacted residual particles, such as furnace ash, is preferably at temperatures ranging from 800–1050° C., and in ebullient motion through the charging into the lower part of the reactor of a mixture of the reactant chlorine gas and other gases, such as nitrogen or oxygen oxides of carbon and a small amount of recirculated $TiCl_4$. As shown in Fig. 1, the apparatus can comprise reactor 1 of corrosion-resistant or other suitable metal, completely lined with a ceramic or other desired refractory material 2 protective against and resistant towards the corrosive effect of the highly heated reactant end product gases. An outlet 3 can be provided in the upper part of said reactor through which iron chloride and titanium tetrachloride products formed in the reaction can be exited to associated equipment (not shown) such as a condensing, separating or recovery system. Suitably disposed in the base portion of the reactor 1 is one (as shown) or a plurality of vertical inlet conduits 4. Within each of said conduits is a spiral insert 9 adapted to be accurately positioned within said conduit at or near the point of entrance of the latter into the reactor chamber and without attaining access to the interior of said chamber. Thus, as shown, said conduits extend jus short (say within 3″) of the inner or floor surface 5 of the refractory liner 2 and function by means of their passages 6 and inlets 7 to enable introduction into the reactor of chlorinating or other gaseous reactant and fluidizing agents from a source of supply (not shown) which communicates with said inlets 7. Such introduction can be effected at any desired controlled rate. A suitably valved inlet 8 communicating with a hopper or other source of titaniferous or and carbonaceous reducing agent supply (not shown) is provided in the upper portion of the reactor 1 through which a titaniferous material and said agent can be charged, either separately or in admixed state as desired, into the reactor and above its fluidized bed. Adjustably mounted or positioned within each of said vertical bottom conduits 4 is a removable, cylindrical, square-threaded spiral or helical insert 9 adapted to form a helix-shaped passage 10, the minor diameter helix angle of which is, as shown at 15 in Fig. 3, less than the angle of slide of solids to be retained within the reactor. The number of turns of the spiral is delineated by the length of the lower boundary surface of the helical passage. In the square-threaded spiral shown in Fig. 2, the length of the lower boundary surface of said helical passage is equivalent to at least $$\left[1 + \frac{h \cos A \cdot \sin B'}{L \sin (A - B')}\right]$$

turns, wherein $h$ = the vertical height of the helical passage
$B'$ = the vertical angle at the minor diameter of the helix
$A$ = the effective angle of repose of the solids
$L$ = "Lead" of the helical thread The cross-sectional area of the spiral insert 9, is, as shown, less than the internal area of the conduit 4 and said insert can be screw-threadedly or otherwise fixedly secured to a metal support rod 12, the lower or base portion 13 of which rests upon a supporting element 14, the latter forming part of the walls of inlet 7.

In the operation of a device of the type described, the reactant fluidizing chlorine-containing gas mixture can be charged into the reactor from a conventional conduit and manifold system through the inlet 7 of the multiple vertical conduits 4 and passage 10 of the spirals 9. Simultaneously, a finely ground (capable of passing 50 mesh) mixture comprising about 1 part of powdered coke and about 5 parts of powdered ilmenite is fed from storage, either continuously or intermittently, through the inlet 8, the reactor having been previously heated to a temperature in excess of about 600° C. and within a range of from about 850–1050° C. by external heat application or by burning coke or other fuel therein. The gaseous feed rate is sufficient in velocity to effectively entrain the comminuted solids in fluidized or bubbling state within the reactor as distinguished from a violent or turbulent gaseous suspension, whereby a highly efficient solids-to-gas contact is maintained. During the reduction treatment such solids are not permitted to settle out to form a solid reacting mass. The gaseous products of reaction ($TiCl_4$ and $FeCl_3$) formed are discharged from the reactor 1 through the outlet 3 for passage to a cyclone or other separatory equipment (not shown), and thence to suitable condensing equipment for final separation and recovery.

By the provision and utilization of a plurality of the helix-shaped throats in the halogenating gas inlets, as herein contemplated, several advantageous results are realized. Thus, such throats serve as constricting orifices for the upward flow of entering fluidizing vapor during periods of reactor operation and prevent or stop bed solids from settling or flowing into the vertical multiple inlet conduits during periods of cessation of fluidizing vapor flow. Furthermore, the constricted throat being the same for all of the individual inlets causes a pressure drop between each of the constrictions and the main vapor inlet header ahead of the manifold to help equalize ebullition throughout the fluidized bed. As above noted, upon cessation of the operation and cutoff of vapor flows the fluidized bed settles down upon the reactor flow. In consequence, the multiple gas inlet conduit entrances, which, during periods of fluidized flow, are in contact with incoming feed gas at relatively low constant temperatures of, say, 100–300° C., become suddenly subjected to the higher temperature of the settling bed solids. The presence and contact of even small amounts of the reactant feed or product gases in these conduits would be very injurious due to their highly corrosive nature.

The actual size of the cross-sectional area of the helix-shaped passage in the spiral inserts will depend upon many factors, including gas flow, reactor operation variables, and the relative dimensions of the helix, etc. In general, this cross-sectional area would be less than ½ that of the inlet conduit and in its preferred embodiment is of the order of ⅕ of that area. Because of the small cross-sectional area and the consequent high velocity, this throat is generally self cleaning. This is particularly advantageous if any solid or liquid which might be inadvertently deposited thereon due to presence of contaminatnts in the vapor stream or otherwise tends to become sticky. The spiral insert can conveniently consist of iron or steel or any other desired metal, although preferably it is composed of a corrosion-resistant metal such as nickel or bronze. Where the most corrosive conditions exist it may be fabricated of glass, silica or other ceramic material. The clearance between the cylindrical wall of the conduit and the outer boundary of the cylindrical spiral can be relatively slight and merely enough to allow passage of said spiral in and out of said conduit. Control of this clearance to a very accurate degree is not essential, although it is preferred that close tolerances be observed.

In its preferred embodiment, the spiral inserts employed when positioned within the conduit will form a helix-shaped passage, the minor diameter helix angle of which is less than the effective angle of slide of the solids being retained within the reactor. In such adaptation the mixture of finely divided ilmenite ore, coke and furnace ash used has an effective angle of slide of 38–45° C. and an effective angle of repose within about the same range, with individual samples being about 2–3° greater than the effective angle of slide. With solids of this type, inlet conduits of about .8″ inside diameter, a thread of about ⅛″, and a minor helix angle of about 25° can be used, with the number of turns required for the removable square-threaded spiral insert being about 2±.3 turns. Some variation in the effective angles of slide and repose will exist and consequently the minimum length of the passage must have some allowable variation for a given operation, particularly where the particles are continuously entering the reaction chamber, continually being reduced in size due to the reaction itself, and at the same time some particles are growing due to cementation reactions and the like.

While square-threaded cylindrical positionable spiral insert elements are preferred, other types and combinations of insertable elements are adaptable for use and to provide a serpentine helix-shaped passage for the upwardly flowing fluidizing gas and to prevent the undesired back-flow of solids from the reactor interior. These elements can be advantageously removable for cleaning without access from within the reactor and can be accurately positioned within the vertical conduit by means of rods or other suitable devices. If desired, the conduit wall can be provided with square-threaded rifling-like grooves which form with a removable cylindrical plug a helical-shaped passage. Alternatively, two or a plurality of insert elements can be utilized in each conduit and can be removed for cleaning from without the reactor. If desired, a cylindrical type plug and a helical spring-shaped element can be employed which, when positioned within the smooth, circular inner wall of the conduit, will form a helical-shaped passage. The critical dimensional requirements of these equivalent modifications of insert elements, forming a helical serpentine passage through which the fluidizing vapor can pass upwardly into a reactor and through the fluidizing solids, are substantially the same as for the preferred square-threaded type of spiral-shaped insert above referred to. That is, the passage which each forms within the vertical inlet conduit must have a helix angle at its minor diameter which is less than the effective angle of slide of the fluidized solids and the open cross-sectional area of said passage must be small compared to the cross-sectional area of the conduit.

The spiral passage insert of this invention can be employed in any process wherein a vapor is to be brought into contact with finely divided or granular solids. It is particularly useful in processes in which finely divided solids are fluidized by suspension in a gas. For example, an air elutriation of sand, ore, pigment, or other type of particulate solids may be advantageously suspended in air introduced into the separation chamber through a square-threaded cylindrical spiral of the type of the invention, allowing the entrance of the vapor from below, but preventing the back-flow of solids, and avoiding plugged inlets. While most useful in the case of multiple vapor inlet processes, the apparatus of the invention is also advantageously useful in a process requiring only one vapor inlet, positioned, for example, at the apex of a funnel-shaped bottom, of a reactor, elutriator, or other type vessel in which gas-suspended solids are required.

For convenience in cleaning and servicing, the insert element used is removable from the conduit. If desired, a complete unit, comprising the spiral insert and inlet tube, can be fabricated for use as a single removable unit. The positioning or supporting rod advantageously can be separable from the insert and removed from the conduit after said insert has been positioned therein. The positioning rod when left in place will not interfere with gas flow, if constructed small in diameter in respect to the conduit.

When removing a spiral insert for cleaning, replacement, or other reason, during a period in which fluidizing gas has been cut off and the beds solids have settled down on the floor of the fluidizing chamber, a temporary, disposable plug can be inserted into the fluidizing gas inlet conduit, to retain the solids within the fluidizing chamber while the necessary servicing of the removable insert is being performed.

The effective angle of slide is the maximum inclination of a surface with the horizontal which allows solids to slide freely down an inclined surface and is a function of the characteristics of the inclined surface and material being retained, and in general is slightly less than the effective angle of repose.

The effective angle of repose of the granular solids is the inclination of a slant height of a cone of finely piled solids with the horizontal.

I claim as my invention:

1. A process for fluidizing solids within a vessel which comprises charging a fluidizing gas upwardly into said vessel through an inlet conduit and through a substantially vertical, helical, serpentine passage maintained in said conduit, said passage having a helix angle at its lower boundary surface which is less than the effective angle of slide of the solids being fluidized within said vessel, and the length of said lower boundary surface being equivalent to at least $$1 + \frac{h \cos A \cdot \sin B}{L \sin (A-B)}$$

turns, wherein $h$ = the vertical height of the helical passage between a point on the radial line generating the upper boundary surface and a corresponding point directly below on the lower boundary surface
$B$ = the maximum helix angle at the lower boundary surface
$A$ = the effective angle of repose of the solids
$L$ = "Lead" of the helical thread.

2. A method for fluidizing solids for reaction within a reaction vessel comprising charging a gaseous fluidizing reactant upwardly into said vessel and through a substantially vertical, helical, serpentine passage provided in the inlet conduit to said vessel, said passage having a helix angle at its lower boundary surface which is less than the effective angle of slide of the solids being fluidized in said vessel, and the cross-sectional area of said helical passage being small relative to the cross section of said conduit, and the length of said lower boundary surface being equivalent to at least $$\left[1 + \frac{h \cos A \cdot \sin B}{L \sin (A-B)}\right]$$

turns, wherein $h$ = the vertical height of the helical passage between a point on the radial line generating the upper boundary surface and a corresponding point directly below on the lower boundary surface
$B$ = the maximum helix angle at the lower boundary surface
$A$ = the effective angle of repose of the solids
$L$ = "Lead" of the helical thread.

3. A process for introducing a fluidizing vapor upwardly through a vertical inlet passage into a reaction vessel to maintain finely divided solids undergoing reaction in fluidized suspension, comprising charging said vapor through a spiral helical passage maintained in the upper porton of said inlet conduit, the helix angle at the minor diameter of the lower boundary surface of said passage is less than the effective angle of slide of the solids being fluidized and retained in said vessel, and the cross-sectional area of said passage being less than about one-half that of said inlet conduit, with the length of the lower boundary surface of said spiral being equivalent to at least $$\left[1 + \frac{h \cos A \cdot \sin B'}{L \sin (A - B')}\right]$$

turns, wherein $h=$ the vertical height of the helical passage
$B'=$ the helix angle at the minor diameter of the helix
$A=$ the effective angle of repose of the solids
$L=$ "Lead" of the helical thread.

4. A method for charging a fluidizing gas into a reactor wherein finely divided solids comprising ilmenite ore and coke are reacted in fluidized state with chlorine at an elevated temperature to produce titanium tetrachloride which comprises passing said chlorine upwardly into said reactor and through a plurality of vertical inlet conduits, and maintaining said solids in uniformly distributed fluidized suspension while preventing their backflow into said conduits by providing in the upper extremity of each of the latter a square-sided, helix-shaped passage having a cross-sectional area of approximately one-fifth that of said conduit with the minor helix angle at the lower boundary surface of said passage being approximately 25° and the length thereof at least two turns.

References Cited in the file of this patent

UNITED STATES PATENTS

| | | |
|---|---|---|
| 836,219 | Schutz | Nov. 20, 1906 |
| 1,112,234 | Stuart | Sept. 29, 1914 |
| 2,486,912 | Belchetz | Nov. 1, 1949 |
| 2,607,662 | Huff | Aug. 19, 1952 |
| 2,662,813 | Packie | Dec. 15, 1953 |